June 24, 1958

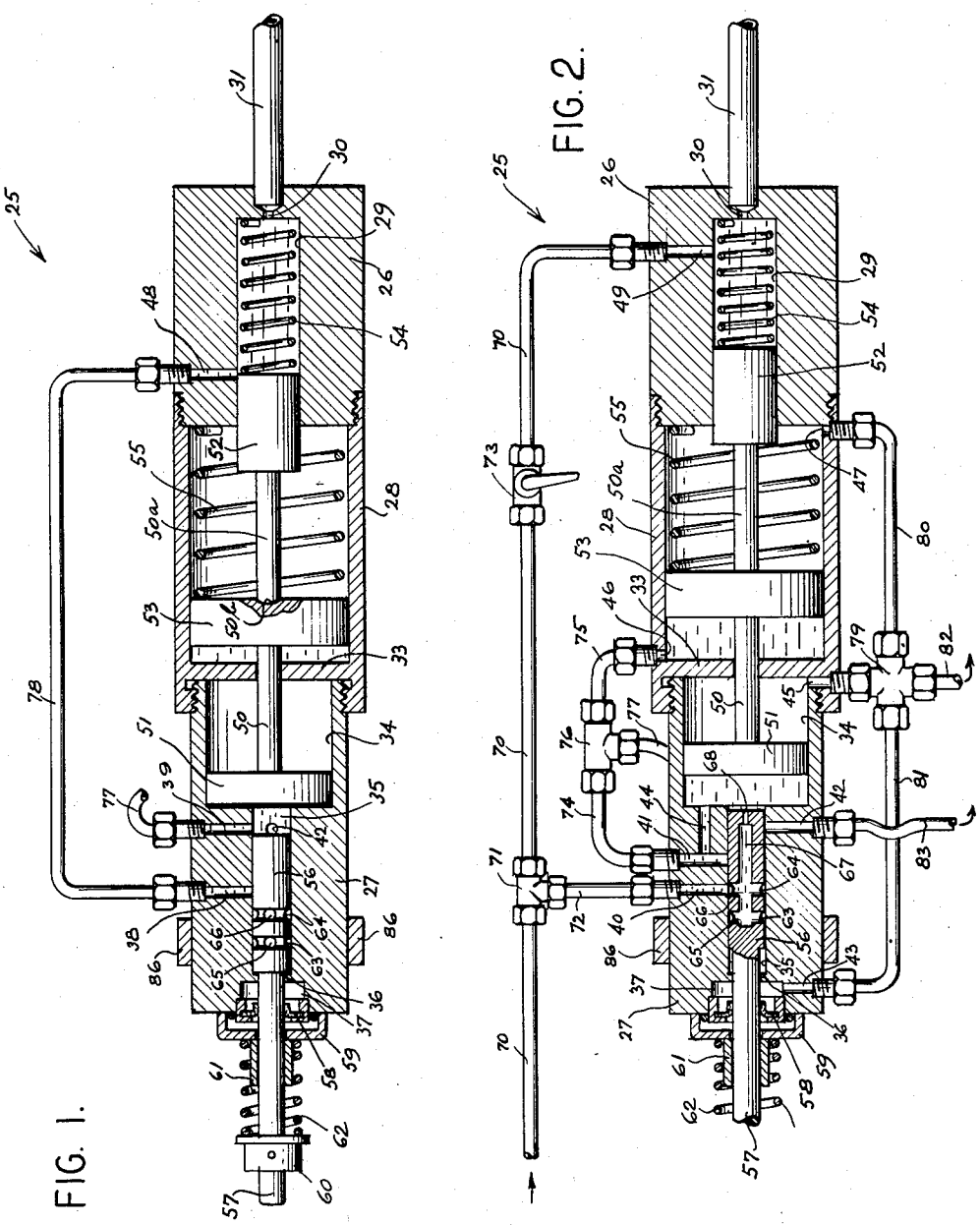

J. CARRION 2,840,044

SERVO BRAKING CONTROL DEVICE FOR SELECTIVE SLOW
AND HIGH SPEED BRAKING OPERATION

Filed May 20, 1952

INVENTOR.
JOSEPH CARRION
BY Mock & Blum
ATTORNEYS

United States Patent Office 2,840,044
Patented June 24, 1958

2,840,044

SERVO BRAKING CONTROL DEVICE FOR SELECTIVE SLOW AND HIGH SPEED BRAKING OPERATION

Joseph Carrion, Pontiac, Mich., assignor of fifteen percent to Murray H. Blumenfeld, New York, N. Y.

Application May 20, 1952, Serial No. 288,807

4 Claims. (Cl. 121—38)

This invention relates to an improved servomotor braking control device for selective slow and high speed braking operation and relates particularly to a braking system for use in conjunction with a single foot pedal which serves as both the brake pedal and accelerator pedal of the automobile.

This application is a continuation-in-part of my copending U. S. patent application Serial No. 252,714, filed October 23, 1951, now abandoned, in which was disclosed a braking system including a single pedal pivoted at its center and operable by a single foot of the driver as both an accelerator and brake pedal, together with a hydraulically operated brake system which permitted only slight pressure on the brake pedal to operate the brake. The brake system shown therein included an intermediate brake cylinder operated by the foot pedal and utilizing hydraulic fluid supplied by the hydraulic transmission system of the automobile. This intermediate brake cylinder converted the slight pressure on the foot brake pedal into a sufficient pressure to operate the usual master brake cylinder of the automobile which utilized the usual brake fluid.

In the present invention I eliminate the master brake cylinder and its separate brake system entirely, and provide a single brake system which utilizes exclusively the hydraulic fluid supplied by the hydraulic transmission system of the automobile. This novel braking system is ideally adapted to be operated by only a slight manual pressure on the foot pedal, so that the aforementioned combined brake and accelerator pedal may be employed. In addition to the economy of manufacture afforded by the elimination of a separate brake system, the danger of loss of brake fluid due to damage of a portion of a separate brake system is avoided. Further, the motorist is given the benefit of economy in operation since brake fluid is entirely eliminated and no additional hydraulic fluid other than that normally used in the fluid transmission is required for operation of the brake system.

Other objects and advantages of the invention will become apparent in the course of the following specification when taken in connection with the accompanying drawings, in which:

Fig. 1 is a horizontal section through the brake unit utilized, the latter being shown in its inoperative position;

Fig. 2 is a vertical section through the brake unit, which is shown in a first operative position;

According to the invention I provide in an automobile a single pedal which serves as both a brake and accelerator pedal, thus eliminating the need for separate pedals for braking and accelerating. This single pedal is operated selectively by either the heel or toe of the driver's right foot.

Figure 4:
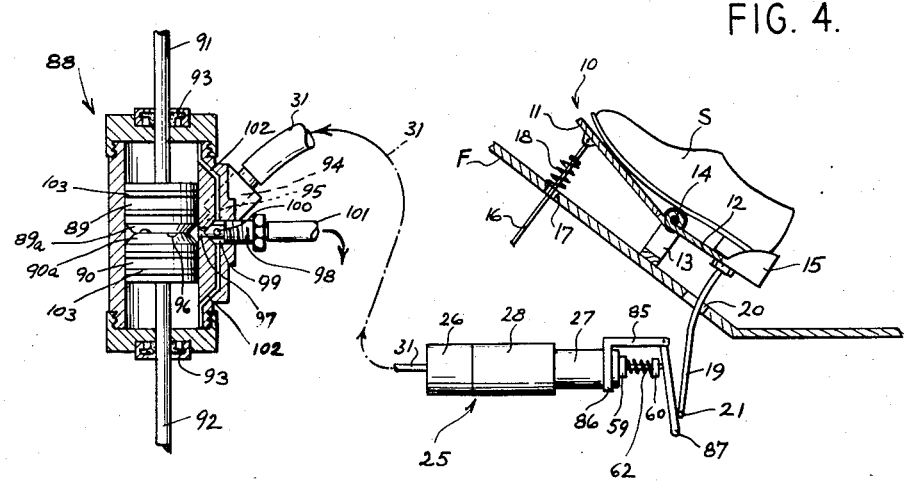
Fig. 4 is a schematic elevation, partially in section, showing the operative relationships of the parts of the entire brake system including the foot pedal and one of the brake cylinders contained in the automobile wheels.

In Fig. 4, the combined brake and accelerator pedal is indicated generally by the reference numeral 10. The pedal 10 is preferably composed of two separate sections 11 and 12 which are separately mounted for individual pivoting movement on a bracket 13 by means of terminal loops 14. The bracket 13 is fixed to the floor-board F of the automobile.

The section 11 is shaped to fit the front end of the driver's shoe while the section 12 is shaped to receive the rear end thereof. The section 11 is therefore termed the "toe-section" while the section 12 is termed the "heel section." The heel section 12 is preferably provided with an upstanding arcuate flange 15 which serves as a heel guard.

The toe section 11 is connected to a rod 16 which extends through an opening 17 in the floor-board F and is operatively connected, in the usual manner, to the carburetor (not shown) for accelerating the automobile. A spring 18 normally biases the toe section 11 upward to its inoperative or non-accelerating position shown in Fig. 4.

The heel section 12 of the pedal 10 is rigidly fixed to a depending bar 19 which extends through an opening 20 in the floor-board F. The free end of bar 19 has a lateral extension 21, so that the lower end of bar 19 is L-shaped. The bar 19 is bent intermediate its ends, as shown in Fig. 4, and is so arranged that downward pivoting of the heel section 12 moves the lateral extension 21 in a generally forward direction (or to the left in Fig. 4).

When the shoe S of the driver is placed upon the pedal 10, the arch of the shoe rests upon the loops 14 which act as a fulcrum for the forward or rearward pivoting of the foot.

In the use of the pedal 10, depression of the heel of the shoe S will operate the braking mechanism of the automobile. In the conventional type of brake system in which mechanical leverage is utilized for operation of the master brake cylinder, too great a downward pressure is required for operation by the heel portion of the foot. I have therefore devised a hydraulic braking system which affords efficient operation of the brakes by merely slight downward pressure on the heel section 12 of pedal 10. The system has the added advantage of utilizing the hydraulic fluid of the automobile transmission, so that a separate brake fluid line is eliminated.

The novel braking system comprises a brake unit indicated generally by the reference numeral 25 which feeds a plurality of brake cylinders, such as the brake cylinder 88 shown in Fig. 4, one of said brake cylinders being preferably located in each of the wheels of the automobile.

The brake unit 25 generally consists of a front end block 26 and a rear end block 27 both threadedly connected to opposite ends of a central cylinder 28. By means of these threaded connections, the unit 25 may be dismantled for repair, cleaning, or the like.

The front end of the cylinder 28 is closed off by the front end block 26 which has a central cylindrical bore 29 communicating with the interior of the cylinder 28. The front end of bore 29 has a restricted opening 30 which in turn communicates with one end of an outlet pipe 31. The outlet pipe 31 feeds the brake cylinders 88 located in the automobile wheels, as is shown schematically in Fig. 4. For this purpose, the outlet pipe 31 may have a plurality of extensions, one of these extensions leading to each of the brake cylinders.

A circular wall or partition 33 is located adjacent the rear end of the cylinder 28 to close off said rear end.

The rear end block 27 has an enlarged end bore 34 which is closed off at its outer end by the wall 33 of the attached cylinder 28. The end bore 34 communicates with an axially alined control bore 35 of substantially lesser diameter which terminates in an extension bore 36 of even lesser diameter, the latter extending into a recessed opening 37 in the outer end surface of the block 27.

Figure 3:
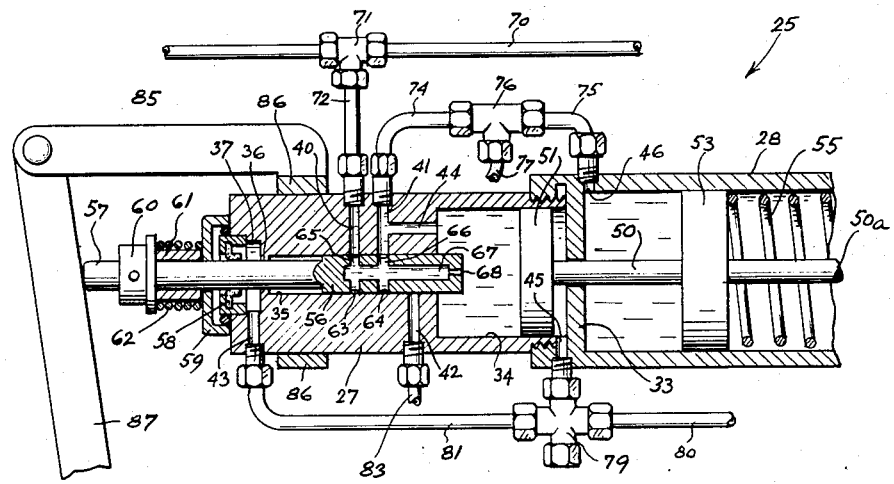
Fig. 3 is a vertical section through the brake unit which is similar to Fig. 2 except that the brake unit is shown in a second operative position.

As shown in Fig. 1, the rear end block 27 has a pair of spaced conduits 38 and 39 extending from the outer side peripheral surface thereof to the control bore 35. As shown in Figs. 2 and 3, the block 27 also has a pair of spaced conduits 40 and 41 extending from the outer top peripheral surface thereof to the control bore 35, and a pair of conduits 42 and 43 extending from the outer bottom peripheral surface thereof respectively to the control bore 35 and the recessed opening 37. As will be presently explained, the location and spacial relationships of these conduits are critical.

A transverse conduit 44 connects the top conduit 41 with the inner end of bore 34, as shown in Fig. 2. The bottom wall portions of the block 27 and cylinder 28 contain alined openings which together form a passageway 45 leading from the interior of end bore 34 to the outside of brake unit 25. A pair of openings 46 and 47 are respectively located at the top rear and bottom front of the cylinder 28.

The front end block 26 contains a transverse bore 48 leading from the outer side surface thereof to the interior of the bore 29, as shown in Fig. 1, and a similar bore 49 leading from the top surface thereof to the interior of bore 29, as shown in Fig. 2.

The brake unit 25 contains an internal piston assembly which comprises a piston rod 50 having pistons 51 and 53 secured at each end thereof, and a piston 52 having a piston rod 50a. The piston 51 is slidable in the bore 34, while the piston 52 is slidable in bore 29 and piston 53 is slidable in central cylinder 28.

The free end of piston rod 50a is normally seated in a shallow central concavity 50b in piston 53, being held therein by the tension of a compression spring 54 which is located in the bore 29 and which abuts the end of piston 52. While the piston 52 acts in concert with pistons 51 and 53, the piston 52 and piston rod 50a are made separate so that the unit can be easily assembled and disassembled.

A coil spring 55 located in central cylinder 28 abuts the outer face of piston 53. The springs 54 and 55 by their biasing force upon the respective pistons 52 and 53, normally urge the piston assembly rearwardly to the position shown in Fig. 1, in which the brake system is not in operation. In this inoperative position the piston 51 is biased against the end of bore 34, while the piston 53 is spaced sufficiently from the cylinder wall 33 to leave the cylinder opening 46 unobstructed, and the piston 52 is located about half way out of the bore 29 so that the bore 48 is open and unobstructed.

A control piston 56 is slidably housed in the control bore 35 of rear end block 27. The control piston 56 has a rigid piston rod 57 which extends through the extension bore 36 and recessed opening 37 to the exterior of the rear end block 27. The piston rod 57 also passes through a seal 58 of conventional type set within the recessed opening 37, and through a dust cap 59 affixed to the rear end surface of block 27. The piston rod has a collar 60 affixed adjacent the free end thereof. The dust cap 59 has an integral coaxial boss 61 which acts as a seat for one end of a compression spring 62 which encircles a portion of the piston rod 57. The other end of spring 62 abuts the collar 60 and urges the piston rod 57 and its piston 56 rearwardly to an inoperative position shown in Fig. 1, in which the control piston 56 is held against the end of control bore 35.

The control piston 56 has a pair of spaced circumferential grooves 63 and 64, each of which contains a respective opening 65, 66 communicating with a longitudinal bore 67. A bore 68 of relatively small diameter extends through the front wall of control piston 56 into communication with the longitudinal bore 67. The grooves 63 and 64 are spaced such a distance from each other that when the groove 63 is in registry with the top conduit 40, the groove 64 is also in registry with the top conduit 41, as shown in Fig. 3.

Hydraulic fluid is supplied under pressure from the hydraulic transmission system of the automobile through an inlet pipe 70 to which is connected by a joint 71, a pipe 72 which communicates with the top conduit 40 of rear end block 27. The pipe 70 then leads to the bore 49 of front end block 26. A manually-operable shut-off valve 73 is interposed on the inlet pipe 70 between the joint 71 and its connection with bore 49.

As shown in Fig. 2, a pair of pipes 74 and 75 are respectively connected to the outer ends of top conduit 41 and opening 46. The free ends of these pipes 74 and 75 are connected by a joint 76 to which a pipe 77 is also connected. The pipe 77, as shown in Fig. 1, communicates with the side conduit 39. The other side conduit 38 is connected to the transverse bore 48 of front end block 26 by an external pipe 78.

One arm of a four-way pipe joint 79 is connected to the passageway 45, as shown in Fig. 2. To the remaining arms of the pipe joint 79 are also connected a pipe 80 communicating with the cylinder opening 47, a pipe 81 communicating with the bottom conduit 43, and a depending drain pipe 82 leading to the hydraulic fluid sump (not shown) of the automobile. The bottom conduit 42 of rear end block 27 is independently connected to said hydraulic fluid sump by a pipe 83.

The brake unit 25 is fixed to the car chassis beneath the floor-board F in approximately the position shown in the schematic view of Fig. 4. The brake unit 25 also includes an external bracket 85 affixed to the outer surface of rear end block 27 by means of an integral ring 86. To the end of the bracket 85 is pivoted a lever arm 87, which is positioned to abut the external end of piston rod 57 and to be actuated by the lateral extension 21 of the heel pedal section bar 19.

Fig. 4 shows one of the brake cylinders 88 to which hydraulic fluid under pressure is fed by the outlet pipe 31. The cylinder 88 is shown in Fig. 4 in a vertical position only for convenience of illustration; actually the cylinder 88 would be mounted at the wheel of the automobile with its longitudinal axis on a horizontal plane. Cylinder 88 contains a pair of opposed facing pistons 89 and 90, each having a respective piston rod 91 and 92 extending through conventional sealing units 93 and projecting from opposite ends of the cylinder. The pistons 89 and 90 have respective bevelled inner ends 89a and 90a leading to planar inner faces which are normally biased into flush abutment with each other at the center of the cylinder 88, by biasing means (not shown).

The inlet pipe 31 is connected to an inlet bore 94 of the cylinder 88 which communicates with an extension bore 95 of smaller diameter. The extension bore 95 leads to the annular space around the bevelled ends 89a and 90a, so that fluid supplied through inlet pipe 31 will be collected under pressure in this annular space to force apart the pistons 89 and 90 are provided with transverse grooves 96 which permit the fluid under pressure to enter between the piston faces. The wall of cylinder 88 has a drain port 97 which is normally closed by a hollow needle valve 98 which is secured by threading to the cylinder 88 and which has an outer peripheral groove 99. A hole 100 located in the groove 99 communicates with the hollow interior of needle valve 98, which in turn communicates with a drain pipe 101 leading to the hydraulic fluid sump. A pair of drain ducts 102 located in the wall of the cylinder 88, communicate at each end of the cylinder recess, and lead to the outer peripheral groove 99 of needle valve 98.

The piston rods 91 and 92 are connected to the brake shoes in the brake drums of the automobile wheels. Each cylinder 88 operates in the usual manner, the fluid entering under pressure through the outlet pipe 31 filling the annular space around the beveled ends 89a and 90a and the transverse grooves 96, to force apart the pistons 89 and 90, and cause the piston rods 91 and 92 to exert force upon the brake shoes.

Brake cylinders of this type generally require a large amount of packing and other sealing material to prevent brake fluid from seeping or leaking behind the pistons, since the fluid once having leaked is lost and wasted. In the present invention the use of the thinner hydraulic fluid would result in even more waste through leakage unless even more effective sealing means were used. By providing the drain system previously described, I eliminate the need for an elaborate sealing assembly, and may provide the pistons 89 and 90 with only conventional piston rings 103. Any hydraulic fluid leaking behind the pistons 89 and 90 will enter the ends of the drain ducts 102 and will flow through the ducts to the peripheral groove 99 in needle valve 98, enter the hole 100, and flow through the hollow interior of needle valve 98 and the drain pipe 101 to the hydraulic fluid sump from which it will be recirculated through the hydraulic transmission and brake system of the automobile.

For the purpose of draining the fluid from the cylinder 88, as when the hydraulic fluid is to be changed, the needle valve 98 is unscrewed a short distance, allowing the fluid to drain directly through the drain port 97 into the hole 100.

After installation of the brake unit 25, the engine is idled and the valve 73 is opened while the brake unit 25 is in its inoperative position of Fig. 1. Hydraulic fluid will then flow from the fluid transmission through pipe 70, valve 73, and bore 49 into bore 29 of front end block 26. Sufficient fluid will flow to completely fill bore 29 and 30, pipe 31, and the annular recess between the pistons 89 and 90 of brake cylinder 88. The valve 73 is then closed manually so that the aforementioned ducts and recesses remain filled with fluid during operation of the braking system. In a similar manner, the pipe 78 shown in Fig. 1 has become filled with fluid, and remains so, since the end of side conduit 38 is closed off by the solid end body portion of control piston 56. The valve 73 is normally maintained in its closed position, but may be opened whenever necessary to replenish any fluid which may have leaked from the bore 29, pipe 31, or any of the brake cylinders 88. Such use of valve 73 should never be necessary, however, except in cases of emergency or extreme damage, since, as will be presently explained, replenishment of the fluid in these parts is automatically taken care of in the normal operation of the brake sysem by pipe 78.

When the automobile is in motion and it is desired to apply braking force in order to bring it to a normal halt, the heel section 12 of pedal 10 is depressed with the heel of the shoe until the brake unit 25 is brought to its first operative position shown in Fig. 2. In this position, the circumferential groove 64 of control piston 56 is in registry with the top conduit 40. Fluid under pressure will then enter through inlet pipe 70 and flow through joint 71, pipe 72, top conduit 40, and groove 64, entering the opening 66 in groove 64 and flowing through the longitudinal bore 67 and the smaller bore 68 of control piston 56 into the end bore 34, thus moving the piston 51 forwardly. When the end bore 34 fills behind the piston 51, some of the fluid enters the transverse conduit 44, and flows through top conduit 41 and pipes 74 and 75 into the interior of central cylinder 28, so that the pistons 51 and 53 are simultaneously urged forwardly.

Movement of pistons 51 and 53, also causes the piston 52 to move forwardly in bore 29, compressing the fluid therein and applying hydraulic pressure through outlet pipe 31 to the brake cylinders 88.

It will be noted that the side conduit 38, shown in Fig. 1, is so located that when the control piston 56 is brought to its operative position of Fig. 2, said conduit 38 is in registry with the groove 64 of said control piston. Fluid supplied by inlet pipe 70 will thus enter conduit 38 and flow through pipe 78 and transverse bore 48 into the bore 29, thereby replenishing any fluid which may have leaked from the system into the fluid sump. This flow is, however, momentary, since as soon as the piston 52 is moved forwardly, it closes off the end of bore 48.

It will be further noted that when the control piston 56 is moved forwardly in control bore 35, it closes off the ends of side conduit 39 and bottom conduit 42, so that no fluid can escape through these conduits.

Since the bore 68 of control piston 56 is of a small diameter relative to the diameters of the top conduit 40 and pipes 70 and 72, the flow of fluid therethrough will be relatively slow, so that the braking action ultimately achieved will be slow and smooth, similar to the normal braking action used when it is desired to stop the automobile. An even more gradual braking can be achieved by pumping lightly on the brake portion of the pedal 10.

When pressure on the pedal section 12 is released, tension of the spring 62 will return control piston 56 to its original inoperative position of Fig. 1, thus immediately relieving the pressure on piston 51. At the same time, the top conduit 40 is closed off while the bottom conduit 42 and side conduit 39 are opened. The fluid under pressure in cylinder 28 may then empty through opening 46, pipes 75 and 77, and side conduit 39 into the control bore 35 from which it may flow through bottom conduit 42 and pipe 83 to the fluid sump, together with the fluid emptying from bore 34 which flows directly into the bottom conduit 42. The fluid will rapidly empty from the cylinder 28 and bore 34, since it does not have to flow out through the small bore 68. Spring 55 will thereupon bring pistons 53 and 51 back to their inoperative positions of Fig. 1, while spring 29 will bring the piston 52 back to its original position, and pressure on the brake cylinder 88 is released.

When it is desired to bring the automobile to a sharp, instantaneous halt, the brake section 12 of pedal 10 is depressed until the spring 61 is fully compressed between the duct cap 59 and collar 60, bringing the brake unit 25 to its second operative position shown in Fig. 3. In this position, the control piston 56 is moved forwardly until its circumferential grooves 63 and 64 are in registry with the respective top conduits 40 and 41. Fluid will then enter under pressure from inlet pipe 70 through pipe 72 and top conduit 40 entering opening 65 in circumferential groove 63, and traversing longitudinal bore 67. Some of this fluid will pass through the small bore 68 in the manner previously described, but most will enter the top conduit 41, flowing through transverse conduit 44 into end bore 34, and also through pipes 74 and 75 into cylinder 28 through opening 46. Thus the cylinder 28 and bore 34 are quickly filled simultaneously since the fluid bypasses the small bore 68, and brake pressure is quickly applied. The pressures applied against the pistons 51 and 53 are the same in the first and second operative positions, except that the pressure is applied more slowly in the first operative position so that the braking is more smooth and gradual.

Any of the hydraulic fluid leaking behind the control piston 56 will drain through bottom conduit 43 and pipes 81 and 82 to the fluid sump. Similarly, any fluid leaking forwardly of pistons 51 and 53 will drain from respective openings 45 and 47 to pipe 82 and thence to the sump for recirculation.

It will be noted that the heel portion 12 of the foot pedal may be brought to either braking position with a very slight pressure of the heel of the shoe, since the only counter-pressure is supplied by the spring 62. However, once the heel portion 12 is depressed, fluid will enter the bore 34 and cylinder 28 through inlet pipe 70 until the brake cylinders 88 are fully actuated. A definite pressure is felt by the foot operating the pedal when the brake unit reaches its first operative position, so that the driver is informed when the unit reaches this position and may hold the brake pedal portion immovable at this point.

The fluid in conventional hydraulic transmission systems of automobiles is generally maintained under a pressure of between 30 and 80 pounds per square inch at idling speeds of the engine. This pressure is almost uniformly increased to 100 pounds per square inch at speeds of 20 miles per hour or over. Because of the difference in cross-sectional area between the pistons 51, 53 and the piston 52, the fluid pressure applied to the brake cylinders 88 is, of course, much greater than 100 pounds per square inch, and is sufficient to effectively brake the automobile at any speed.

Since the piston 51 drives the piston 52, these pistons may be respectively referred to as the "drive" and "driven" pistons. Similarly, the piston 53 may be referred to as an "auxiliary drive piston." The control bore 35 in the block 27 may be referred to as a "control chamber" while the enlarged end bore 35 of block 27 may be referred to as a "pressure chamber" and the bore 29 of block 26 may be referred to as a "compression chamber." The hollow recess of the central cylinder 28 which contains the auxiliary drive piston 53 may function as an auxiliary pressure chamber and may be referred to as such.

While a preferred embodiment of the invention has been shown and described herein, it is obvious that numerous additions, changes, and omissions may be made in the invention without departing from the spirit and scope thereof.

I claim:

1. In an automobile braking system, a braking pedal, a servomotor control device for selective slow and high speed braking operation, said device comprising a casing, having a pressure chamber at the front thereof and a main bore connecting with the rear of said pressure chamber, a slide valve slidably disposed within said main bore, a rod fixed to said slide valve and protruding rearwardly out of said casing, a spring coupling said rod and casing and normally urging said rod rearwardly to define a normal rear position of said slide valve, and means non-resiliently coupling said brake pedal and said rod, said slide valve having an axial valve bore extending to the front end thereof and a pair of axially spaced radial bores extending from said valve bore to the periphery of said slide valve, said casing having an intake conduit communicating with said main bore and adapted to be filled with hydraulic fluid under pressure, said casing also having a by-pass conduit connecting between the rear of said pressure chamber and said main bore at a point located forwardly of the point of connection therewith of said intake conduit, the front end portion of said valve bore being of reduced diameter compared to the diameter of the main portion of said valve bore and the diameters of said radial bores and of said conduits, said slide valve being movable between its normal position and a front position through an intermediate position thereof, the front radial bore communicating with said intake conduit and said slide valve blocking said by-pass conduit in the intermediate position of said slide valve, the arrival of said slide valve in said intermediate position from said normal position being adapted to be signalled by the increased resistance to pedal pressure, the front radial bore communicating with the intake conduit and the rear radial bore communicating with the conduit in the front position of said slide valve.

2. A servomotor control device for both slow and high speed action comprising a casing having a chamber and a bore communicating with the rear of said chamber, a piston slidably disposed within said chamber, a three-position slide valve disposed within said bore, said casing also having a hydraulic fluid intake conduit connecting with said bore and a by-pass conduit connecting with the rear of said chamber and with said bore at a point located forwardly of the point of connection of said intake conduit, said slide valve having a passage communicating between the front end thereof and the periphery thereof at a point located behind its front end, said slide valve blocking both of said conduits in the rearmost position thereof, said passage communicating with said intake conduit in the intermediate position of said slide valve with said slide valve still blocking said by-pass conduit, said passage communicating with said by-pass conduit in the frontmost position of said slide valve, said slide valve having a further passage communicating with the first-mentioned passage and also extending to the periphery of said slide valve, said further passage communicating with said intake conduit in said frontmost position of said slide valve, the front end portion of said first-mentioned passage being of a reduced diameter which is less than the diameter of the main portion of said first-mentioned passage and the diameter of said further passage.

3. A servomotor comprising a casing, a pressure chamber in said casing having a rear inlet opening, a piston slidably located within said pressure chamber, spring means coupling said casing and said piston and normally maintaining said piston in a position proximate to said rear inlet opening, said casing having a bore extending at its front end to said inlet opening, a slide valve slidably disposed within said bore and movable between respective rear and front positions, spring means coupling said casing and said slide valve and normally maintaining said piston in said rear position, said casing having an intake conduit connecting with said bore and adapted to be supplied with hydraulic fluid under pressure, a by-pass conduit connecting at its rear end with said bore forwardly of the connection point therewith of said intake conduit, said by-pass conduit connecting at its front end with the rear of said pressure chamber, and an exhaust conduit connecting with said bore forwardly of the connection therewith of said by-pass conduit, said slide valve having an axially extending valve bore opening on the front end thereof, the front end portion of said valve bore being of a reduced diameter which is smaller than the diameter of the main portion of said valve bore and the diameters of said conduits, and a pair of axially spaced ports on the periphery of said slide valve and respectively communicating with said valve bore, said ports being out of communication with with said intake and by-pass conduits and said slide valve being clear of said exhaust conduit in the normal rear position of said slide valve, said slide valve having an intermediate position in which the front port communicates with said intake conduit, said by-pass conduit being out of communication with said ports and said slide valve blocking said exhaust conduit, both of said ports respectively registering with said intake conduit and said by-pass conduit in the front position of said slide valve, said slide valve then blocking said exhaust conduit.

4. A servomotor device comprising a casing having a pressure chamber and a bore connecting with the rear of said pressure chamber, a piston slidably disposed within said pressure chamber, means normally urging said piston rearwardly, a slide member disposed within said bore, means normally urging said slide member rearwardly to define a normal rear position of said slide member, means for moving said slide member forwardly, means for withdrawing hydraulic fluid from said pressure chamber rearwardly of said piston so as to permit said piston to assume its normal position and so as to permit relatively easy movement of said slide member in a forward direction during initial movement thereof, said slide member being movable between its normal position and a front position through an intermediate position thereof, said device having an intake adapted to be connected to a source of hydraulic fluid under pressure, normally inactive low velocity fluid flow means connecting between said intake and the rear of said pressure chamber, means coupling said slide member and said low velocity fluid flow means for actuation of said low velocity fluid flow means when said slide member is in said intermediate position so as to permit low velocity flow of hydraulic fluid under pressure into said pressure chamber, said hydraulic fluid under pressure providing increased resistance to continued forward movement of said slide member, normally inactive high velocity fluid flow means connecting between said intake and the rear of said pressure chamber, and further means coupling said slide member and said high velocity fluid flow means for actuation of said high velocity fluid flow means when said slide member is in its front position so as to permit high velocity flow of hydraulic fluid into said pressure chamber.

References Cited in the file of this patent

UNITED STATES PATENTS

| | | |
|---|---|---|
| 747,772 | Rickman | Dec. 22, 1903 |
| 1,588,659 | Christensen | June 15, 1926 |
| 2,209,418 | Overbeke | July 30, 1940 |
| 2,229,247 | Kamenarovic | Jan. 21, 1941 |
| 2,241,374 | Alfieri | May 13, 1941 |
| 2,281,755 | Dunning | May 5, 1942 |
| 2,328,684 | Schnell | Sept. 7, 1943 |
| 2,344,055 | Osborn | Mar. 14, 1944 |
| 2,473,361 | Carlson | June 14, 1949 |
| 2,553,080 | Ching | May 15, 1951 |
| 2,662,377 | Miller | Dec. 15, 1953 |

FOREIGN PATENTS

| | | |
|---|---|---|
| 243,588 | Great Britain | Dec. 3, 1925 |
| 656,845 | France | Jan. 5, 1929 |